[11] 3,617,934

[72] Inventor Joseph P. Segre
 45 Quaboag Road, Acton, Mass. 01720
[21] Appl. No. 854,704
[22] Filed Sept. 2, 1969
[45] Patented Nov. 2, 1971

[54] CONVERSION OF TANGENTIAL AND RADIAL POLARIZATION COMPONENTS TO RECTANGULAR COORDINATE COMPONENTS
 8 Claims, 10 Drawing Figs.
[52] U.S. Cl............................................ 331/94.5, 350/150
[51] Int. Cl........................................... H01s 3/00
[50] Field of Search............................ 331/94.5; 350/160, 150, 147

[56] References Cited
UNITED STATES PATENTS
3,484,714  12/1969  Koester et al.................. 331/94.5

*Primary Examiner*—William L. Sikes
*Attorneys*—Lane, Aitken, Dunner & Ziems and William C. Nealon

ABSTRACT: An electro-optic crystal such as lithium niobate is formed into a half-wave plate to convert tangential and radial polarization components in a laser beam to rectangular coordinate components. To achieve this polarization conversion a transverse electric field is applied to the crystal in an uniform strength pattern such that the direction of the field varies with the angular position in the crystal changing at the same rate as the angular rate of change of position in the crystal. Such polarization conversion devices are combined with a laser and in a laser cavity to limit laser oscillations in the laser cavity to be either only tangentially polarized or only radially polarized.

PATENTED NOV 2 1971

INVENTOR
JOSEPH P. SEGRE'

BY Lane, Aitken, Dunner & Ziems
ATTORNEYS

INVENTOR
JOSEPH P. SEGRE'

BY Lane, Aitken, Dunner + Ziems
ATTORNEYS

CONVERSION OF TANGENTIAL AND RADIAL POLARIZATION COMPONENTS TO RECTANGULAR COORDINATE COMPONENTS

BACKGROUND OF THE INVENTION

This invention relates to polarization conversion systems and, more particularly, to a system for converting radial and tangential polarization components into rectangular coordinate components and to laser systems using such polarization conversion systems.

It is frequently desirable to analyze the radial and tangential components of polarization in a beam of coherent light. For example, in a glass laser system, the laser glass is normally in the shape of a cylindrical rod. The process of exciting the laser rod to a condition in which it will amplify light normally will also introduce radial thermal gradients into the rod. The thermal gradients in the rod will induce birefringence in the laser medium of the rod and a deformation of the rod geometry. In addition under these thermal stress conditions, the rod may also have an induced lens power. As a result of the radial thermal gradients, the medium will behave quite differently for the radial and tangential components of polarization of the laser light passing through the rod parallel with the axis of the rod. For this reason it is desirable to be able to examine the behavior of the tangential components and the radial components separately. A conventional plane polarizer by itself cannot be used to isolate either the tangential or radial components since the polarization of the light which is transmitted through such polarizer is parallel throughout the aperture of the polarizer and, accordingly, the transmitted light will contain both tangential and radial components.

SUMMARY OF THE INVENTION

The present invention provides a means to rotate the radial components of polarization to be parallel with one of a pair of rectangular coordinates and the tangential components of polarization to be parallel with the other rectangular coordinate of such pair. Accordingly, a conventional plane polarizer can then be used to isolate the component parallel to either rectangular coordinates and, accordingly, to isolate the component that was either originally tangential or originally radial. This conversion of radial and tangential components to rectangular coordinate components is accomplished by means of a crystal which becomes birefringent to transmission along its optical axis when an electric field is applied transverse to the optic axis. The birefringence is such that components of polarization parallel to one set of axes, called slow axes of birefringence, are retarded relative to polarization components parallel to another set of axes, called fast axes of birefringence. The slow and fast axes of birefringence at a given point in the crystal are perpendicular. The fast and slow axes of birefringence of the crystal vary with the angle of the applied electric field vector rotating half the angle of rotation of the electric field vector. When an electric field of the proper geometric configuration is applied to a half waveplate made of such a crystal, it will rotate the tangential polarization components to be parallel with one of a pair of rectangular coordinates and the radial polarization components to be parallel with the other rectangular coordinate of such pair.

In accordance with the present invention such a polarization converter is used in combination with a laser to isolate either the tangential or the radial components of polarization and also to limit laser oscillations in a laser cavity to either radial or tangential components. By limiting the laser oscillations to be either tangential or radial the performance of the cavity can be optimized by selecting the component which provides the best results.

Accordingly, an object of the present invention is to facilitate the analysis of radial and tangential components of polarization in a beam of light.

Another object of the present invention is to facilitate the analysis of tangential and radial components of polarization in a laser beam.

A further object of the present invention is to provide a device which will convert tangential and radial polarization components to rectangular coordinate components.

A still further object of the present invention is to isolate either tangentially polarized light or radially polarized light.

A still further object of the present invention is to limit laser oscillations in a laser cavity to be either tangentially polarized or to be radially polarized.

Further objects and advantages of the present invention will become readily apparent as the following detailed description of the invention unfolds and when taken in conjunction with the drawings.

DESCRIPTION OF THE PREFERRED EMBODIMENTS

Figure 1:
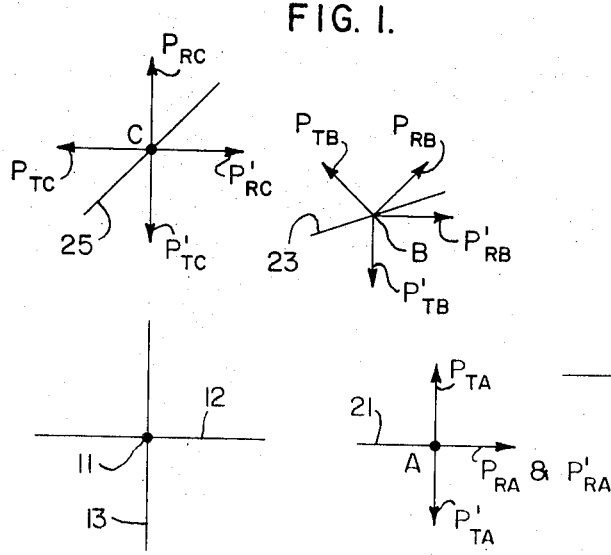
FIGS. 1 and 2 are vector diagrams illustrating the operation of the polarization conversion device of the present invention.

The problem which the present invention solves can better be understood with reference to the vector diagram shown in FIG. 1, in which the tangential and radial components of polarization are represented by vectors at three points A, B and C in the cross section of a laser beam. The radial and tangential components are represented by vectors with reference to axis 11, which normally would be the axis of the laser rod which generates the laser beam. The points A, B and C are located at different angular positions about the axis 11 with the point B being displaced 45° from the point A and the point C being displaced 90° from the point A. At point A the tangential component of polarization is represented by the vector $P_{TA}$ and the radial component is represented by the vector $P_{RA}$. The tangential and radial components of polarization at point B are represented by the vectors $P_{TB}$ and $P_{RB}$, respectively. The tangential and radial components at the point C are represented by the vectors $P_{TC}$ and $P_{RC}$, respectively. The present invention provides a polarization conversion means which rotates all of the radial components of polarization in the laser beam to be parallel with one of a pair of rectangular coordinates and all of the tangential components to be parallel with the other of the pair of rectangular coordinates. Assuming for purposes of illustration that the rectangular coordinates to which the radial and tangential components are to be made parallel are those designated by the reference numbers 12 and 13 in FIG. 1, and assuming that the radial components are to be made parallel to the rectangular coordinate 12, then the tangential components should be made parallel to the rectangular coordinate 13. The components of polarization $P_{RA}$ and $P_{TA}$ are already parallel to the rectangular coordinates 12 and 13, respectively. Accordingly, these components should remain parallel to the coordinates 12 and 13 after passing through the polarization conversion device of the present invention. At point B on the other hand, the polarization conversion device must rotate the polarization components through 45° so that $P_{RB}$ becomes parallel to coordinate 12 and $P_{TB}$ becomes parallel to coordinate 13. At point C, the polarization components $P_{RC}$ and $P_{TC}$ must be rotated through 90° so that $P_{RC}$ becomes parallel to coordinate 12 and $P_{TC}$ becomes parallel to coordinate 13.

Figure 2:
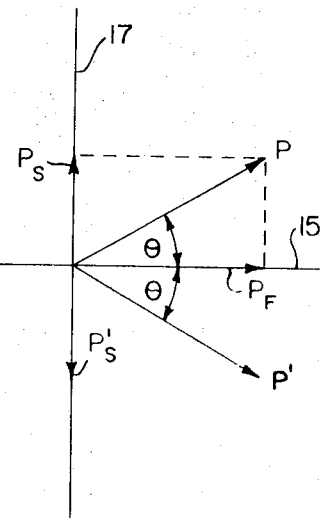

The polarization conversion device of the present invention makes use of a retardation plate, which performs polarization rotation by retarding the polarization components to be parallel to one set of axes of birefringence, referred to as the slow axes, relative to the polarization components parallel to another set of axes of birefringence, referred to as the fast axes. The slow and fast axes of the retardation plate extend transversely to the optic axis or in other words to the direction of travel of the laser beam through the retardation plate. More specifically the retardation plate is a half waveplate, which means that at the particular wavelength of interest the components parallel to the slow axes are retarded one half wavelength relative to the components parallel to the fast axes. FIG. 2 is a vector diagram illustrating how a half waveplate performs polarization rotation. In FIG. 2, the polarization of a laser ray is represented by the vector P, which is at an angle $\theta$ with respect to the fast axis 15 at the position of the laser ray, the slow axis being designated by the reference number 17. The component of the vector P parallel to the fast axis is designated by the reference number $P_F$ and the component of the vector P parallel to the slow axis is designated $P_S$. After passing through the half waveplate, the component $P_S$ will be retarded one-half wavelength relative to $P_F$ so that it will be reversed 180° with respect to $P_F$. Thus, $P_S$ will become $P'_S$. The polarization of the laser ray after emerging from the half waveplate will be P', the vector sum of $P_F$ and $P'_S$. P' is rotated an angle of $2\theta$ to the other side of the fast axis 15. In this manner, the retardation plate rotates the angle of polarization through $2\theta$ to the other side of the fast axis, $\theta$ being the being the angle between the polarization vector and the fast axis.

If the angle $\alpha$ of the fast axes in a retardation plate is related to the angular position $\Phi$ in the plate with respect to the optic axis so that $\alpha$ changes at one half the rate $\Phi$ changes, the retardation plate will perform the desired conversion of the radial and tangential polarization components to be parallel with rectangular coordinates. For example, in FIG. 1 if the angular position $\Phi$ of the point A is considered to be zero and if the fast axis is parallel to the coordinate 12 at A, then at any given point $\alpha$ should be equal to $\frac{1}{2}\Phi$, $\alpha$ being the angle between the fast axis and the coordinate 12. In FIG. 1, the fast axis of the example described above at point A is designated by the reference number 21. Since the radial component $P_{RA}$ is parallel to the fast axis 21, it will not rotate upon passing through the retardation plate and thus will remain parallel with the coordinate 12. On the other hand, the angle between the fast axis 21 and the tangential polarization component $P_{TA}$ is 90° so the component $P_{TA}$ will rotate through 180° to become $P'_{TA}$ as shown in FIG. 1 and will still be parallel to the coordinate 13. At point B where the angular position $\Phi$ is 45°, the angle $\alpha$ of the fast axis with respect to the coordinate 12 should be 22.5°. In FIG. 1 the fast axis at this angle at point B is designated by the reference number 23. Thus, the radial component $P_{RB}$ being at an angle of 22.5° with respect to the fast axis 23 will rotate through an angle of 45° upon passing through the retardation plate to become component $P'_{RB}$ and will be parallel to the coordinate 12. The tangential component $P_{TB}$ makes an angle of 67.5° with respect to the fast axis 23 and, accordingly, will rotate through 135° upon passing through the retardation plate to become $P'_{TB}$, which is parallel to the coordinate 13. At point C, the fast axis 25 should be at an angle 45° with respect to the coordinate 12, the angle $\Phi$ being 90°. The radial polarization component $P_{RC}$ will thus make an angle of 45° with the fast axis 25 and will rotate 90° upon passing through the retardation plate to become $P'_{RC}$, which is parallel to the coordinate 12. Similarly, the tangential polarization component $P_{TC}$ makes an angle of 45° with respect to the fast axis 25 and will rotate through 90° to become $P'_{TC}$ upon passing through the retardation plate. Thus $P_{TC}$ will be parallel to the coordinate 13. In this manner, after passing through the proposed half waveplate each of the radial polarization components is made parallel to the coordinate 12 and each of the tangential polarization components is made parallel to the coordinate 13. In a similar manner, the tangential and radial components at all other angular positions about the axis 11 will be rotated to be parallel with the coordinates 12 and 13 respectively as long as the angle of the fast axis with respect to the coordinate 12 is related to the angular position $\Phi$ in the retardation plate with respect to the optic axis 11 so that $\alpha$ equals $\frac{1}{2}\Phi$. To achieve a half waveplate having its fast axes related to their angular position in the manner described above, the half waveplate is made out of lithium niobate or similar electro-optic crystal having a crystallographic point group 3M and a predetermined uniform electric field pattern is applied to the half waveplate transverse to the direction of light wave travel through the plate. When a transverse electric field is applied to such a crystal, the crystal becomes birefringent having fast and slow axes of birefringence as described above. These axes of birefringence vary with the direction of the electric field such that the direction of the axes of birefringence change at twice the rate that the direction of the electric field changes. Thus in such a half waveplate the angle of the fast axis at a given point will depend upon the angle of the applied transverse electric field at such point in accordance with the following expression:

$$\alpha = \tfrac{1}{2}\psi$$

in which $\alpha$ is the angle of the fast axis and $\psi$ is the angle of the electric field with respect to a reference axis. Thus, if the electric field pattern is such that the direction of the electric field changes with the angular position about the optic axis at a rate equal to the rate of change in angular position, the half waveplate will perform the desired conversion from tangential and radial to parallel with rectangular coordinates.

Figure 3:
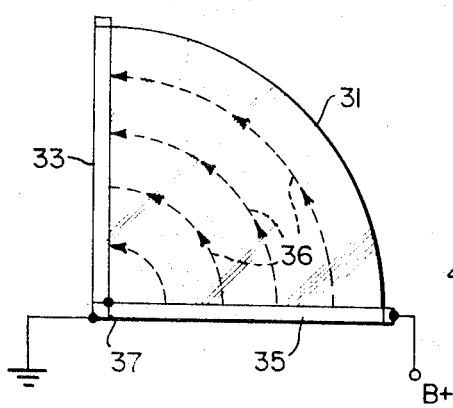
FIGS. 3 and 4 illustrate two different embodiments of the polarization conversion device of the present invention.

FIG. 3 illustrates how such a pattern can be applied to a lithium niobate crystal to achieve the desired conversion in one quadrant with respect to the optic axis. As shown in FIG. 3, the crystal is in the form of a pie-shaped plate 31 with a conductor 33 formed along one side thereof and an electrically resistive electrode 35 formed along the other side thereof. The electrode 33 is connected to ground and the end of the electrode 35 adjacent to the electrode 33 is also connected to ground. The other end of the electrode 35 is connected to a source of positive voltage so that a voltage gradient appears across the electrode 35. As a result, an arcuate electric field having a pattern represented by dashed lines 36 will be formed through the plate 33. The voltage gradient across the electrode 35 is selected so that field pattern 36 will have a uniform strength throughout the plate. The amount of retardation of polarization components which are parallel with the slow axis relative to the polarization components parallel to the fast axis will depend upon the strength of the electric field, which in turn will depend on the voltage applied across the electrode 35. This voltage is selected so that the retardation is one-half wavelength thus making the plate 31 a half waveplate. The angle that the transverse electric field makes in the plate 31 with respect to an axis passing through the corner 37 on the plate perpendicular to the plate will correspond precisely with the angular position in the plate about the corner 37. Thus, if the plate 31 is placed in the laser beam perpendicular thereto so that the corner 37 is on the optic axis, the quadrant of the laser beam which passes through the plate 31 will have its radial components of polarization all rotated to be parallel with one of a pair of rectangular coordinates and will have its tangential polarization components all rotated to be parallel to the other of such pair of rectangular coordinates.

Figure 4:
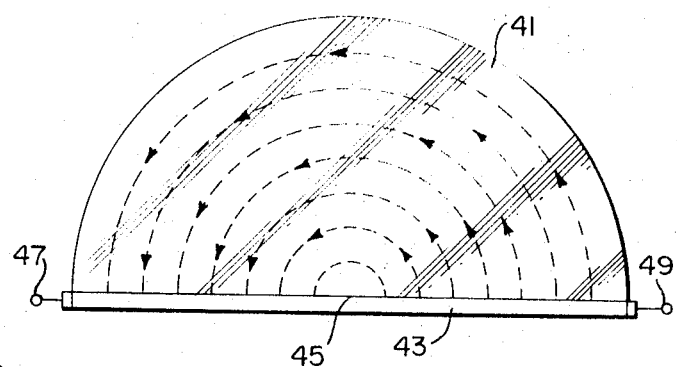

FIG. 4 illustrates schematically another embodiment of the polarization conversion deice of the present invention. The device shown in FIG. 4 will convert the tangential and radial components in a semicircular half of the laser beam to be parallel with rectangular coordinates. In FIG. 4 the lithium niobate crystal is formed into a semicircular plate 41 having a resistive electrode 43 formed along one edge thereof. The lithium niobate crystal is placed in the laser beam so that the radial center 45 of the crystal is on the optic axis and half of the laser beam must pass through the crystal 41. A voltage is applied between terminals 47 and 49 connected to opposite ends of the resistive electrode to produce a voltage gradient along the electrode 43. As a result, the electrode 43 will generate an arcuate electric field pattern in the plate 41 illustrated by the dashed lines shown in FIG. 4 on the plate 41. The gradient is again selected so that the electric field is of uniform strength throughout the plate. The voltage applied across the electrode 45 is s elected to provide half-wave retardation. Because the direction of the field changes with the angular position at the same rate as the change in angular position, this field pattern satisfies the requirements described above for converting tangential and radial polarization components to rectangular polarization components. Accordingly, the polarization components in that half of a laser beam which passes through the plate 41 will be rotated to be parallel with rectangular coordinates.

Figure 5:
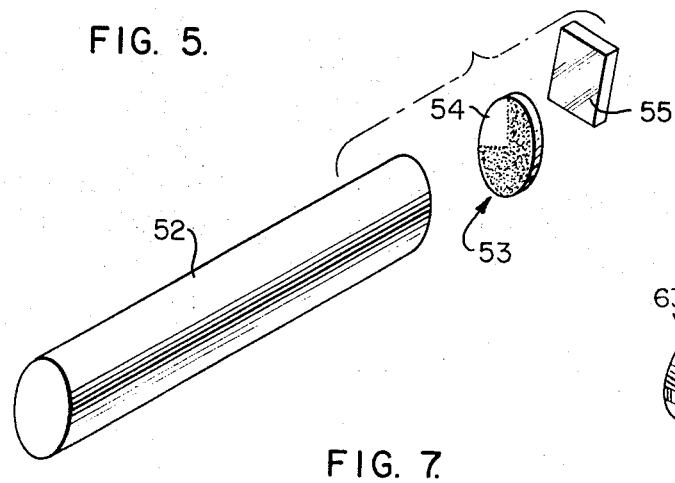
FIG. 5 illustrates a laser system in combination with the conversion device shown in FIG. 3.

FIG. 5 schematically illustrates the converter of FIG. 3 in combination with a glass rod laser. As shown in FIG. 5, the laser is designated by the reference number 52. The laser 52 will generate a laser beam which is circular in cross section and which is directed upon a circular plate 53 positioned in the path of the laser beam. One quadrant 54 of the plate 53 comprises a converter as shown in FIG. 3 and the remainder of the plate 53 is nontransmissive to the laser beam.

The plate 53 is positioned perpendicular to the laser beam with the corner of the quadrant 54 at the center of the plate 53 on the axis of the laser beam. As a result, the radial and tangential components of polarization of that quadrant of the laser beam which impinges upon the quadrant 54 will be converted to be parallel to the rectangular coordinates upon passing through the quadrant 54. The remainder of the laser beam will not be transmitted through the plate 53. A plane polarizer 55 is positioned to intercept the converted portion of the laser beam passing through the quadrant 54 and will transmit only polarization components parallel to one of a pair of rectangular coordinates. The polarizer 55 is oriented to pass either these polarization components which were radial before passing through the quadrant 54 or those components which were tangential prior to passing through the quadrant 54. Thus, the system of FIG. 5 will isolate either the radial components of polarization in one quadrant of a laser beam or will isolate tangential components of polarization depending upon the orientation of the polarizer 55. Accordingly, the tangential and radial components in one quadrant of the laser beam can be separately analyzed. Since each quadrant will be substantially identical, the analysis of one quadrant will provide a complete analysis of the beam. The embodiment of FIG. 4 may be employed in a similar manner with a laser and plane polarizer.

Figure 6:
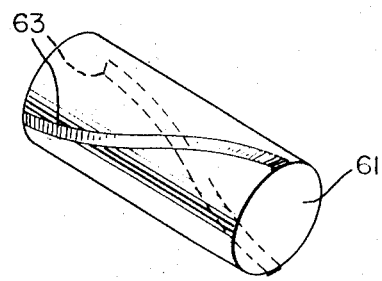
FIGS. 6 and 7 illustrate another embodiment of the polarization conversion device of the present invention.
Figure 7:
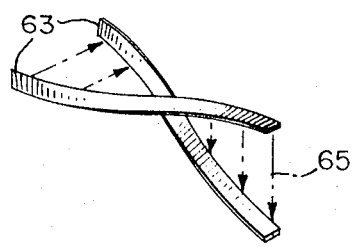

FIG. 6 and 7 illustrate still another embodiment of the polarization conversion of the device of the present invention. As shown in FIG. 6, the lithium niobate crystal or other equivalent crystal is formed in the shape of a round cylinder 61. On the cylindrical surface of the cylinder 61 are two helical electrodes 63 which extend generally in the direction of the axis of the cylinder 61 but which wind about the axis 61 through angles of 90°. In FIG. 7, the cylinder 61 has been omitted to more clearly illustrate the orientation of the electrodes 63 relative to one another. A voltage is applied between the two conducting electrodes to set up an electric field extending in a twisted strip passing through the cylinder 61. This twisted strip can be best visualized by observing the dashed lines 65 in FIG. 7 which represent the electric field generated between the electrodes 63. The cylinder 61 is placed with its axis on the optic axis of the laser cavity so that the laser beam passes axially through the cylinder 61. The electric field generated between the electrodes 63 will have a direction which changes with the change in angular position of the field about the optic axis and at the same rate as the rate of change of angular position. As a result, the radial and tangential polarization components of a laser beam passing axially through the cylinder 61 will be converted to components parallel to rectangular coordinates.

Figure 8:
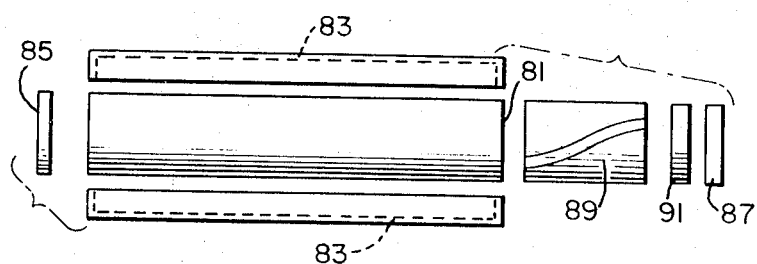
FIG. 8 illustrates a laser system including the polarization device of FIGS. 6 and 7 in the laser cavity to limit laser oscillations to be either only tangentially polarized or either only radially polarized; and, FIGS. 9 and 10 illustrate still further embodiments of the polarization conversion device of the present invention.

FIG. 8 illustrates the conversion device of FIGS. 6 and 7 in combination with a glass laser rod system in a laser cavity. As shown in FIG. 8 the glass laser rod is designated by the reference number 81. The rod is excited to a state in which it will emit and amplify laser light by flashlamps 83 positioned adjacent to the rod 81. Reflectors 85 and 87 are positioned at opposite ends of the rod 81 to reflect laser rays travelling parallel to the axis of the rod back into the rod. With each successive reflection through the rod 81, the laser rays will receive further amplification resulting in a standing wave of laser light energy called laser oscillations to be set up between the reflectors 85 and 87. The space between the reflectors 85 and 87 is referred to as a laser cavity. In this laser cavity between the end of the rod 81 and reflector 87 a polarization conversion device 89, such as the one shown in FIG. 6, is positioned. Between the polarization conversion device 89 and the reflector 87 is a plane polarizer 91 which will transmit polarization components parallel to only one of a pair of rectangular coordinates. The polarization conversion device 84 functions to convert the radial and tangential components of polarization of the laser oscillations generated in the cavity to be parallel with rectangular coordinates. As a result, absent the plane polarizer 91, the radial and tangential polarization components would become parallel to rectangular coordinates between the device 89 and the reflector 87. The conversion device 89 reconverts the polarization components of the rays back to radial and tangential on their passage back through the device 89 after being reflected on the reflector 87. The plane polarizer 91 is oriented to transmit either only polarization components, which are radial between the reflectors 85 and the conversion device 89 or only those polarization components which are tangential between the reflector 85 and the conversion device 89. Accordingly, laser oscillations will occur in the cavity which are either only tangentially polarized in the rod 81 or only radially polarized in the rod 81. By rotating the polarizer 91 either of the two components may be selected for the laser oscillation to optimize the operation of the system.

Figure 9:
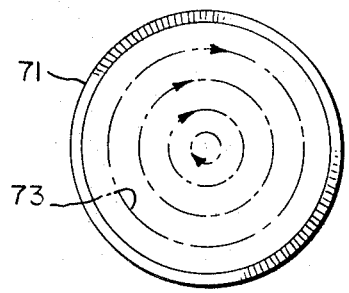
Figure 10:
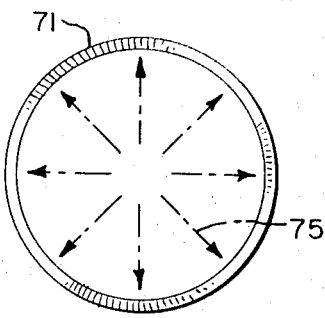

FIGS. 9 and 10 illustrate two alternative methods of generating the desired electric field in the lithium niobate crystal to achieve the desired conversion. In both of these figures a circular lithium niobate plate is placed in a circular waveguide 71. In the embodiment of FIG. 8, the waveguide is made to transmit in a radial mode causing the electric field illustrated by the circular dashed lines shown in FIG. 8 to be generated in the lithium niobate plate. In FIG. 9, the waveguide is made to transmit in a tangential mode so that tangential electrical field pattern is set up in the lithium niobate crystal. Both of these patterns are of the necessary shape to perform the desired conversion. However, since the fields will be oscillating, the required field strength will be present only part of the time and the desired conversion will only occur periodically.

The above description is of a preferred embodiment of the present invention and many modifications may be made thereto without departing from the spirit and scope of the invention.

What is claimed is:

1. In combination means to generate a beam of coherent light, and means to convert the tangential components of polarization in at least a quadrant of said beam to be parallel with one of a pair of rectangular coordinates and to convert the radial components of polarization in said quadrant of said beam to be parallel with the other of said pair of rectangular coordinates.

2. A combination as recited in claim 1 wherein said beam generating means comprises a laser in which the laser material comprises a glass rod.

3. A combination as recited in claim 1 further comprising a plane polarizer positioned in the path of the components of polarization of said beam oriented to transmit the polarization components parallel to only one of said pair of rectangular coordinates.

4. A combination as recited in claim 1 wherein said means to convert the tangential and radial components of polarization comprises an electro-optic crystal of the type which becomes birefringent with fast and slow axes of birefringence upon the application of a transverse electric field to said crystal, the direction of fast and slow axes of birefringence changing in said crystal with changes in the direction of the applied transverse electric field at an angular rate at twice the angular rate of change in direction of the applied transverse electric field, and means to apply an electric field to said crystal in a pattern whereby the direction of said field changes with the angular position in said crystal about an axis thereof at an angular rate equal to the rate of change of angular position.

5. A combination as recited in claim 4 wherein the amount of retardation provided by said fast axes of birefringences relative to said slow axes depends upon the strength of the applied transverse electric field, said means to apply a transverse electric field pattern applies said field at a uniform strength to provide a retardation along said slow axes relative to said fast axes of one half wavelength of said beam of coherent light.

6. A laser system comprising means defining a laser cavity, means to generate laser oscillations in said cavity including a laser material, said oscillations potentially having a set of tangential components of polarization and a set of radial components of polarization about an optic axis in said laser material, means to eliminate from the oscillations in said cavity one of said sets of components of polarization.

7. A laser system as recited in claim 6 wherein said laser material comprises a rod of laser glass.

8. A laser system as recited in claim 6 wherein said means to eliminate one of said sets of components of polarization comprises means to convert the tangential components of polarization to be parallel with one of a pair of rectangular coordinates and to convert the radial components of polarization to be parallel with the other of said pair of rectangular coordinates and a plane polarizer positioned to intercept the converted components of polarization and oriented to transmit only those components parallel to one of said pair of rectangular coordinates.

* * * * *